Feb. 21, 1961     I. E. MUSKAT ET AL     2,972,554
PAD AND METHOD OF MAKING SAME
Filed May 23, 1955

Inventors,
Irving E. Muskat
and Joseph J. Klein
By: Schneider & Dressler, Attys

United States Patent Office 2,972,554
Patented Feb. 21, 1961

2,972,554

PAD AND METHOD OF MAKING SAME

Irving E. Muskat, Miami, Fla., and Joseph J. Klein, Glencoe, Ill., assignors to Fiber Bond Corporation, a corporation of Illinois Filed May 23, 1955, Ser. No. 510,408

9 Claims. (Cl. 117—76)

This invention relates to a foamed resin, fiber-reinforced pad and to a method of making same. It also relates to a foamable resin, fiber-reinforced porous batt and to the method of making the same.

The pad of the present invention comprises a bonded fibrous batt matrix having a labyrinth of inter-communicating voids between the fibers and a foamed resin coating about the individual fibers but not completely filling the voids, so that the resulting unitary structure has the spring and resiliency of an all foam rubber pad and retains substantially, or at least to some extent, the void formation of the matrix. The resulting pad is thus porous to air or other gaseous bodies and even to water.

The batt matrix is made preferably of fibers which are held by mechanical interengagement and by a bonding agent in an uncompressed, three-dimensional, random arrangement throughout the length, width and depth of the batt. In the preferred batt matrix some of the fibers extend transversely throughout the depth of the batt and tie the batt into an integral structure. In this batt matrix the fibers are pre-bonded together substantially only at their points of contact by a suitable adhesive, preferably by an elastic adhesive such as rubber. If desired, a batt matrix of unbonded fibers arranged in random arrangement with intercommunicating voids between the fibers, may be foamed with resin as herein described and simultaneously bonded into an integral structure. The pre-bonded batt matrix has a softness, resilience, loft and strength which lends itself to being foamed as herein described with a resinous, rubber or other foam without the aid of extraneous restraining means such as a mold, and with retention of the loft. The resulting foamed resin, fiber reinforced pad is more resilient than the batt matrix and is substantially stronger, being capable of such rough use as a pad underlay for rugs.

In accordance with the method of the present invention, a bonded or unbonded batt matrix of randomly arranged fibers having intercommunicating voids between the fibers, is impregnated with a foamable, but not foamed, resin to coat the individual fibers of the matrix without completely filling the voids therein. This may be done, for example, by dipping the batt into a liquid foamable resin composition and squeezing out the excess resin between pressure rollers, or it may be done by lightly spraying the fibers of the batt with foamable resin. The resin-containing matrix is then heated to cause the resin to foam about the fibers of the batt and form the pad of the present invention. In accordance with the process of the present invention the foaming of the resin about the individual fibers takes place substantially simultaneously. There is no progressive foaming of the resin through the batt matrix, as in the prior art, and, consequently, the fiber and void formation of the batt matrix is substantially maintained in the final product.

By employing a batt of fibers held in random, three-dimensional relationship and bonded together by a suitable adhesive substantially only at their spaced points of contact, it is possible to obtain a pad having the qualities of pads made solely of foam rubber or foamed resins. In such a batt matrix a minimum amount of foamable resin can, desirably, be used, sufficient to coat the fibers but short of the amount which would fill completely the voids of the matrix and destroy the porosity thereof. A pad can thus be manufactured at but a fraction of the cost of pads made of foam rubber or resin foams, as in the prior art.

A further advantage in making pads by simultaneously foaming the resin about the individual fibers in accordance with the present invention is the ability to control the thickness of the pad to rather closely held tolerances without employing a mold or other means heretofore required to control the resin foam during its expansion.

The pad of the present invention has substantially the same thickness as that of the batt matrix before addition of the resin foam. This is a surprising result for it was anticipated that the increase in volume of the resin during the foaming thereof would cause the fibrous matrix to expand to a thickness greater than its original thickness. The pre-bonded batt matrix does not expand to any appreciable extent and this fact is particularly advantageous in allowing for the manufacture of pads of desired thickness by the simple expedient of controlling the initial thickness of the matrix.

Pads made in accordance with the present invention have a wide variety of uses as cushioning materials, filters, insulating materials and the like. The relative rigidity or resiliency of the pad may be varied as desired upon proper selection of the type of fibers employed in the batt matrix and the amount and nature of the resin foam employed. It will be manifest that a resin foam having sponge-like qualities will be employed in a pad used as a rug cushion, for example, whereas a more rigid resin foam would be employed more likely in a pad used for filtering or insulation purposes.

It is important that the batt matrix of randomly arranged, preferably pre-bonded fibers be sufficiently resilient to return to its original loft after compression. Otherwise, any compression of the batt during impregnation with a foamable resin and manipulation thereof in the manufacturing procedure, may cause matting or balling of the fibers of the batt. Such matting or balling may preclude obtaining a pad with a resin foam extending uniformly about the individual fibers of the pad and the thickness of the pad will be difficult to control.

It has been found in accordance with the present invention that the resin foam "grows" around the individual fibers and forms a lattice work about the fibers with even distribution of the foam in the pad. The pad as described herein has a structural stability, resilience and loft heretofore unobtainable with prior art foamed resin, fiber-reinforced pads and retains these properties and the original thickness of the batt matrix even after repeated compressions for extended periods of time. Additionally, the pad is porous, being characterized by a labyrinth of intercommunicating voids, albeit of smaller size than the voids in the batt matrix.

A preferred illustrative embodiment of a pad constructed in accordance with the present invention and which incorporates the above mentioned advantages and other advantages is shown in the accompanying drawings, in which.

Figure 1:
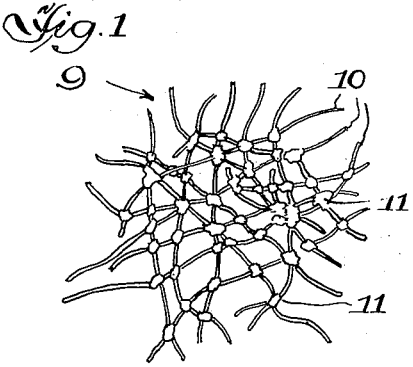
Figure 1 is an enlarged detail view of a portion of the batt used in accordance with the present invention, and illustrating the random, three-dimensional arrangement of uncompressed fibers in a preferred batt matrix.

Referring to the drawings, the fibrous batt 9 which forms the matrix for the pad is shown in Fig. 1. It is made with non-matting fibers 10 adhered in three-dimensional, random arrangement substantially only at the points of intersection of the fibers. The fibers preferably are curled or crimped, but straight fibers of the same type may be used. It is also preferred that the fibers be coarse, to maintain the loft of the batt. We have found that satisfactory fibers are synthetic fibers such as nylon, rayon, cellulose acetate, acrylic fiber (a copolymer of vinyl chloride and acrylonitrile) commercially available under the trademark "Dynel," acrylic fiber (formed from a polymer of acrylonitrile) commercially available under the trademark "Orlon," polyvinylidene chloride-polyvinyl chloride copolymer fiber commercially available under the trademark "Saran," and the like. Nonorganic fibers such as glass fiber, commercially available under the trademark "Fiberglas," may also be used as may natural fibers such as wool, cotton or hog's hair. The above mentioned fibers may be used alone or mixed with each other.

The fibers are preferably of various lengths, from about one-half inch to two and one-half inches, and are intermingled in random arrangement so that they lie at various angles throughout the length, width and depth of the batt, to form a three-dimensional batt with the individual fibers contacting each other at their separate points of contact throughout the batt. In the preferred batt matrix illustrated in the drawings, some of the fibers extend transversely throughout the depth of the batt to insure structural stability of the batt and for this reason the length of some of the fibers should exceed the desired thickness of the batt. For example, to make a batt one inch thick, it is preferred that at least 50 percent of the fibers employed be about one and one-half inches in length. Relatively few pairs of individual fibers contact at more than one point, and each fiber of the batt contacts a plurality of other fibers at spaced points which may be in the same or in different planes.

The batt is sprayed or otherwise coated lightly with an elastic adhesive on either one or both surfaces, preferably both surfaces. The amount of adhesive is sufficient to coat at least the outer fibers of the batt so that they adhere to each other and to the transversely extending fibers at their points of contact only, as indicated at 11. The spaces between the fibers should be substantially free of adhesive so as not to interfere with the formation of resin foam about the individual fibers, as herein described. The small amount of the adhesive which passes through the interstices between the outer fibers wets the underlying fibers and causes them to adhere at their points of contact. Apart from incidental impregnation of some fibers with adhesive, the fibers are in the main unimpregnated and hence retain their natural springiness and impart to the batt the desired resilience and loft.

The spaced joining of the three-dimensional, random arrangement of the fibers and the transversely extending fibers prevents matting and re-orientation of the fibers due to externally applied forces. Also, the elastic adhesive applied thereto substantially increases the resiliency of the batt and provides additional "body" which aids in supporting the batt when the pad is being made and which also cooperates with the resin foam to provide a more efficient unitary structure after the pad is complete. Batts which are pre-bonded with an elastic adhesive make pads which are greatly superior to those which have not been bonded with an adhesive. The bonded batts are self-supporting and have great structural strength so that when used as a matrix with a foaming resin, they will restrain the foaming action without a mold or other restraining means. Furthermore, the unbonded batts tend to mat when compressed and the thickness of the pad may be unpredictably variable. However, an unbonded batt may be used as the matrix, if desired, as hereinabove pointed out.

Any elastic adhesive material such as natural rubber, synthetic rubber, or adhesive resinous or other plastic material may be used to bond the fibers of the batt matrix. The adhesive material may be applied in solution or in emulsion form. In the case of either natural or synthetic rubber, for example, it is applied in the form of an aqueous suspension or latex, with or without vulcanizing agents, and the adhesive coating is then dried to precipitate the rubber. Any conventional, commercially available, natural rubber latex may be used in accordance with the invention, alone or in combination with a synthetic rubber latex. A suitable synthetic rubber latex which may be used as the adhesive is the rubbery copolymer of butadiene and acrylonitrile sold under the trademark "Carbopol." If desired, there may be incorporated into the natural rubber latex or the mixed natural and synthetic rubber latices small amounts, about 0.25 to 3.0%, of a resin which serves to add quick tack and strength to the adhesive. Examples of resinous adhesives that may be used include solutions of polyvinyl chloride or polyvinyl acetate or copolymers thereof in organic solvents and powdered phenolformaldehyde resins.

The adhesive applied to the fibers is dried to a non-tacky state, either naturally or artificially, without compacting the batt. This prevents the adhesive coating on any fiber from adhering to any other fiber except at the points where the fibers are in contact with each other in the uncompressed, three-dimensional, random arrangement in which the batt is initially formed. If the batt is compressed after the adhesive is dried, the fibers which are brought into contact by the compression will not adhere to each other, and the resiliency of the fibers will cause them to spring back to their original positions when the compressing force is released.

Figure 2:
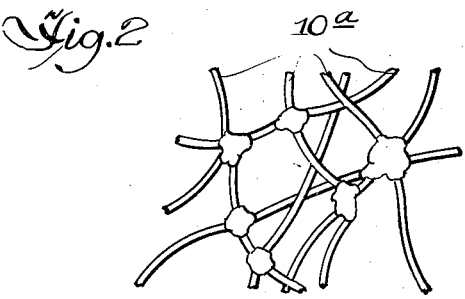
Fig. 2 is an enlarged sectional view of the batt, illustrating how certain of the fibers extend transversely throughout the depth of the batt.

The resilience and loft-retaining qualities of the batt are due primarily to the random, three-dimensional arrangement of the fibers, and to the thin, elastic adhesive coating which fastens the batt fibers together only at their spaced points of contact. The use of crimped or curled fibers increases the resilience of the batt over that attained with straight fibers. As illustrated in Figs. 1 and 2, a cross section of a batt formed from crimped or curled fibers appears as a series of bridges in all directions and planes, thus giving greater loft than the same amount of straight fibers. The use of fibers of different lengths, but wherein at least 50 percent of the fibers are longer than the depth of the batt, provides a better fiber distribution throughout the batt and also provides more points of contact.

The random, three-dimensional arrangement of uncompressed fibers and the cross tying fibers which extend transversely through the depth of the batt are important where it is desired to obtain a porous pad of substantially the same thickness as the batt matrix. Adhesive coated fibrous batting has been made in the past, but this batting included fibers arranged randomly generally along only two dimensions, that is in single planes or layers, and, with these batts, more or less matting and compression of the fibers takes place during bonding. In contrast, the arrangement of fibers of the preferred batts used herein are random in all directions throughout the length, width, and depth of the batt, with some of the fibers 10A extending transversely throughout the depth of the batt to further help to tie the batt into an integral, unitary structure. There is no matting and compression of the fibers. By employing batts wherein the fibers are in random, three-dimensional arrangement as described, it is possible to make pads of uniform thickness, comparable to the thickness of the batt matrix, with surprisingly small quantities of resin foam.

The batt matrix above described is impregnated with a suitable foamable resin to coat the individual fibers. The excess resin, namely, that filling the voids, is squeezed out. The resin-impregnated matrix is then heated to a foaming or curing temperature of between about 200° to 400° F. for a suitable period of time, to simultaneously foam the resin about the individual fibers. When the resin is incorporated in a batt matrix of the present invention and caused to foam, the foam "grows" substantially simultaneously along and around the individual fibers 10 and 10A and the resin is supported by the fibers both during the growth period of the foaming operation and after the resin has been set. With resin foams per se, where the foam is self-supporting, it is necessary to employ relatively large quantities of resin foam to achieve desired thicknesses. By employing a batt matrix in accordance with the present invention, much less resin foam is needed to achieve comparable pads.

Figure 3:
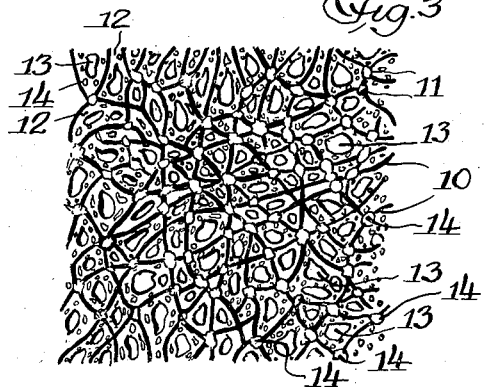
Fig. 3 is an enlarged sectional detail view of a portion of a pad made in accordance with the present invention.
Figure 4:
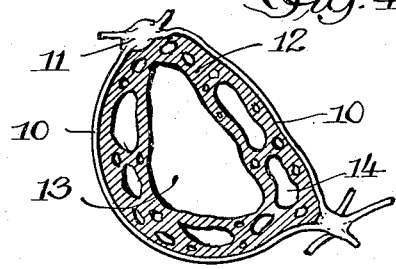
Fig. 4 is a greatly enlarged view showing the manner in which the resin foam is adhered about the individual fibers.

Referring to Figs. 3 and 4, it will be seen that the foamed resin 12 surrounds the individual fibers 10 and 10a and there are intercommunicating voids 13 in the areas unoccupied by fibers. There are a plurality of additional voids 14 surrounded by resin, which are the result of expansion of the gaseous blowing agent in the foamable resin during the foaming operation. If a resin is caused to foam without a batt matrix, the only voids will be those formed in the resin by the expansion of the gas. With the present invention, a substantially smaller quantity of resin foam is needed to form a pad and a lighter weight pad is thus obtained. This pad has a compression set comparable to pads made from resin foam alone, but it is more stable and lighter in weight and cheaper to make because of the smaller quantities of resin foam employed. It is substantially more tear-resistant than all-resin foam pads.

The foaming resins which may be used in accordance with the present invention are well known to the art. The foamable resin may be either thermoplastic or thermosetting depending upon the ultimate use for the finished product. It is preferred that the foamable resin be in liquid form, for example, aqueous emulsion form, for ease of incorporation into the fibrous batt prior to the heating and foaming step. Plasticizers and stabilizers may be added to the foamable resin in accordance with known techniques to adjust the texture of the completed product to that desired.

Suitable foaming resin compositions are disclosed in U.S. Patent Nos. 2,577,279, 2,498,621, 2,572,568, 2,623,023 and 2,461,942. Other foamable resin compositions may, of course, be used. These compositions, as is known, contain blowing agents which engender gases upon being heated to proper temperatures, such as carbon dioxide, ammonium carbonate, potassium carbonate, guanidine carbonate, sodium bicarbonate, ammonium bicarbonate, diazo aminobenzine, diazo aminotoluene, diazo di-isobutyronitrile, hydrogen peroxide and the like. In practice the blowing agents are mechanically admixed with suitable plastics or mixtures thereof such as synthetic rubbers like butadiene-acrylonitrile copolymers; synthetic plastic materials like polyvinyl chloride and copolymers of vinyl chloride and other polymerizable monomers such as vinyl acetate; alkyd resins; phenol-formaldehyde resins and the like. Foamable resins are commercially available in the market, one such product, which contains polyvinyl chloride, is sold under the name "Vinylafoam" by Interchemical Corporation. The particular foamable material employed will obviously depend upon the physical characteristics desired in the finished product.

Figure 5:
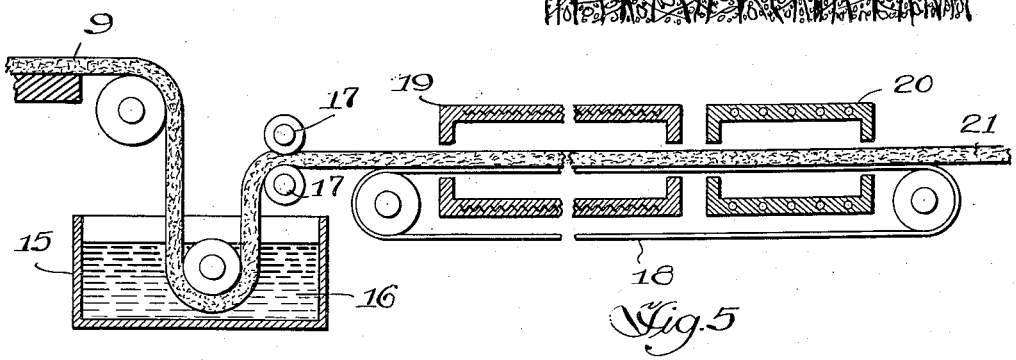
Fig. 5 is a diagrammatic view of a method of making a pad.

Fig. 5 is a diagrammatic illustration of a continuous method of making the preferred pads in accordance with the invention. The bonded batt matrix 9, having the construction described, is passed into a tank 15 containing a suitable foamable resin 16. The resin-impregnated batt matrix is then passed through squeeze rollers 17 which squeeze out excess resin, namely, that filling the voids. The pressure between the rollers is adjusted to retain the desired amount of resin in the matrix and the excess resin falls back into the tank 15. Generally, about 1 to 10 parts of foamable resin composition, by weight, to 1 part by weight of the batt, is left in the batt. It is preferred to leave from about 2 to 5 parts by weight of foamable resin composition to 1 part by weight of the batt, in the batt.

The resiliency of the bonded batt matrix is such that even after it is impregnated with foamable resin, it springs back to its original thickness after emerging from the squeeze rollers. The resin-impregnated batt matrix is then carried on a conveyor belt 18 into a suitable oven 19 where it is heated to the foaming temperature and the resin is caused to foam and grow along and about the individual fibers 10 and 10A of the batt. No mold or other restraining means is employed as the resin-impregnated batt passes through the oven. The length of time that the product remains in oven 19 depends upon the speed at which it passes through the oven and will vary with the resin foam employed. After the pad emerges from the oven, it passes into a cooling chamber 20 where it is cooled to room temperature by any suitable means, for example, by jets of cool air. The finished pad 21 emerges from the cooling chamber and has substantially the same thickness as the batt matrix 9 before its impregnation with the foamable resinous material.

Figure 6:
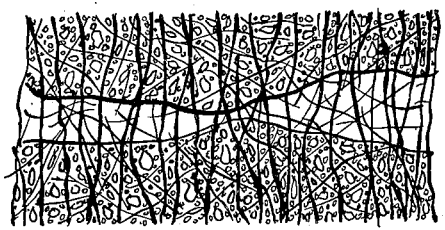
Fig. 6 is an enlarged sectional view of a portion of a pad illustrating a modified form of the invention.
Figure 7:
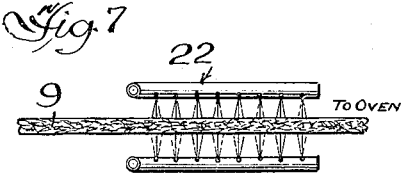
Fig. 7 is a partial diagrammatic view showing an alternative method of impregnating the batt with foamable resin.

It is preferred to dip the batt matrix into the resin in the manner above described, for this method of impregnation is the simplest and results in an even distribution of resin foam within the batt matrix. Other suitable manners of impregnation may be used, however. The resin may be spread on the matrix with a doctor blade, or it may be sprayed on the batt in the manner shown in Fig. 7 by means of suitable spraying means 22. It is more difficult to obtain complete and uniform impregnation by spraying, but in some cases it is desirable to spray only the surfaces of the batt matrix. A pad formed by such spraying is illustrated in Fig. 6, wherein the resin is caused to foam along the fibers, especially those adjacent the surfaces of the batt matrix, which enables the making of a paid with still less resin foam than one which is completely impregnated with resin foam.

The following are examples of pads made in accordance with the present invention:

*Example 1*

A batt ¼" thick was made of ½" "nylon" fibers in the random three-dimensional arrangement described and bonded lightly with a rubber adhesive at the intersections of the fibers. The batt was then dipped in "Vinyafoam." Excess resin composition was squeezed out between pressure rollers so that about 3 parts by weight of resin composition were retained in each part by weight of the batt. The batt was then passed through an oven and heated to 300° F. for four minutes, after which it was cooled by jets of air. A pad ¼" thick was obtained.

*Example 2*

A 1" thick batt made of "Orlon" fibers 1½" long, but otherwise similar to the bonded batt of Example 1, was treated in the manner described in Example 1 except that the batt was impregnated with four parts by weight of "Vinyafoam" for each part by weight of the batt, and the impregnated batt was heated to 350° F. The resulting pad was 1" thick.

Example 3

2 parts by weight of meta-toluene di-isocyanate was added to 3 parts by weight of a resin made by reacting 4 mols of glycerol, 2.5 mols of adipic acid and ½ mol phthalic anhydride, to make a foamable resin. 3 parts by weight of this foamable resin were incorporated in 1 part by weight of the batt in Example 1, and the impregnated batt was heated to 300° F. until foaming was completed. A pad ¼" thick was obtained.

Example 4

A foamable resin was prepared by mixing 10 parts of diallyl phthalate with 15 parts of alkyd resin prepared by reacting 6 mols of diethylene glycol, 5 mols of fumaric acid and 1 mol of sebacic acid in the presence of 0.2 part of benzoyl peroxide. 1 part of ammonium bicarbonate was mixed in the above composition and 3 parts by weight of this mixture was dispersed in a ⅛" thick batt made in accordance with the invention from ¼" wool fibers. The impregnated batt was heated to 225° F. until the resin was completely polymerized and foaming had stopped.

Example 5

The batt of Example 1 was impregnated with five times its weight of a composition containing 1 part of ammonium bicarbonate and 10 parts of alkyd resin prepared by reacting 6 mols of diethylene glycol, 5 mols of fumaric acid, 1 mol of sebacic acid and 10 parts of bis allkyl lactocarbonate in the presence of 0.15 part of benzoyl peroxide. The impregnated batt was heated to 250° F. until complete polymerization and foaming had been obtained.

In accordance with the present invention the fibers of a batt matrix may be coated with a foamable resin as herein described and the coated matrix may be dried at a relatively low temperature, below the foaming temperature, without foaming the foamable coating. There is thus obtained a porous batt matrix having the individual fibers coated with a dried, at least dry to the touch, foamable material. This product can be sold as such and can be foamed at the desired time by simply heating it to the foaming temperature. For example, it may be foamed in situ between surfacing materials to which it may be adhered.

In making the dried, foamable product it is preferred to incorporate the foamable resinous composition in a carrier that can be volatilized at temperatures well below the foaming and/or curing temperature. For example, a foamable polyvinyl alcohol resin or phenolic resin composition can be incorporated in a low boiling naphtha (butane fraction) or in methylene dichloride. These carriers can be volatilized readily below the foaming temperatures of the compositions and, in the case of the phenolic composition, also below its curing temperature.

Preferred embodiments of the invention have been described in considerable detail. It will be understood that the description thereof is intended to be illustrative, rather than restrictive, as many details may be modified or changed without departing from the spirit or scope of the invention. For example, it may be found desirable to provide the batt matrix with a suitable backing material, such as cheese cloth, and this can be accomplished by placing the backing material on the batt matrix before it is bonded with the adhesive as above described. Also, the character of the foamable material, resin, rubber, etc., may be varied, although the foamable resins are preferred because of their commercial availability and low cost. It will therefore be apparent that the present invention is not to be limited to the specific structure, materials and methods described except as limited by the scope of the appended claims.

We claim:

1. A method of making a foamed resin, fiber-reinforced, unitary porous pad in which the foamed resin surrounds and is reinforced by fibers of a loose fibrous batt and in which the porous pad retains substantially the void formation of said batt which comprises the steps of dipping a non-woven, adhesive bonded batt in a heat foamable liquid resin composition, said batt comprising a plurality of loosely intermingled fibers bonded in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, squeezing out excess resin to limit resin substantially to a coating on the fibers, heating the resin-containing batt free from any restraining means to a temperature sufficient to foam the resin interiorly of said batt and around the fibers thereof, said resin, when foamed, being insufficient in amount to completely fill said interconnecting voids, and cooling the pad so formed.

2. A continuous method of making a foamed resin, fiber-reinforced, unitary porous pad in which the foamed resin surrounds and is reinforced by fibers of a loose fibrous batt and in which the porous pad retains substantially the void formation of said batt which comprises the steps of dipping a non-woven porous adhesive bonded batt of random arranged fibers in a heat foamable liquid polyvinyl chloride resin composition, compressing the batt to squeeze out excess foamable resin filling the voids of the batt but not that coating the fibers, heating the resin-containing batt sufficient to foam the resin interiorly of said batt and around the fibers thereof, and cooling the pad so formed.

3. A continuous method of making a foamed resin, fiber-reinforced, unitary porous pad in which the foamed resin surrounds and is reinforced by fibers of a loose fibrous batt and in which the porous pad retains substantially the void formation of said batt which comprises the steps of impregnating a non-woven porous adhesive bonded batt of random arranged fibers with a heat foamable resin composition, compressing the batt to squeeze out excess foamable resin filling the voids of the batt but not that coating the fibers, heating the resin-containing batt to a temperature sufficient to foam the resin interiorly of said batt and around the fibers thereof, and cooling the pad so formed.

4. A foamed resin, fiber-reinforced, unitary porous pad comprising a fibrous batt matrix having a plurality of normally uncompressed synthetic fibers bonded with adhesive in intermingled, random, three-dimensional arrangement with at least some of said fibers extending transversely throughout the depth of the batt, defining a labyrinth of intercommunicating voids, and a foamed polyvinyl chloride resin composition adhered to and surrounding the fibers of said batt matrix but not filling the said voids to destroy their intercommunication and said foamed resin having voids within said adhering foamed resin.

5. A foamed resin, fiber-reinforced, unitary porous pad comprising a fibrous batt matrix having a plurality of normally uncompressed fibers bonded with adhesive with an elastic adhesive in intermingled, random, three-dimensional arrangement with at least some of said fibers extending transversely throughout the depth of the batt, defining a labyrinth of intercommunicating voids, and a foamed resin composition adhered to and surrounding the fibers of said batt matrix but not filling the said voids to destroy their intercommunication and said foamed resin having voids within said adhering foamed resin.

6. A foamed resin, fiber-reinforced, unitary porous pad comprising a fibrous batt matrix having a plurality of fibers bonded with adhesive in intermingled, random arrangement to define a labyrinth of intercommunicating voids, and a foamed resin composition adhered to and surrounding the fibers of said batt matrix but not filling the said voids to destroy their intercommunication and said foamed resin having voids within said adhering foamed resin.

7. In the production of a fiber-reinforced unitary porous pad, the improvement comprising coating the fibers of a loose fibrous batt comprising fibers bonded with adhesive in random three-dimensional arrangement and forming therebetween a labyrinth of intercommunicating voids, with a foamable resin composition without substantially filling said intercommunicating voids and then foaming said foamable resin internally of said batt to cause said resin to foam and grow outwardly away from said fibers into said intercommunicating voids, the quantity of said coating being insufficient when foamed to completely fill said intercommunicating voids.

8. A method of making a fiber-reinforced unitary porous pad which comprises the steps of impregnating a porous, adhesive bonded batt of random arranged fibers defining a labyrinth of intercommunicating voids with a heat foamable resin composition, limiting the quantity of resin composition to a coating on the fibers and to an amount insufficient to fill the voids and to destroy their intercommunication when the resin composition is foamed, and drying the impregnated structure to a manually handleable condition.

9. A foamable resin, fiber-reinforced, unitary porous pad comprising a fibrous batt matrix having a plurality of normally uncompressed fibers bonded with adhesive in intermingled, random, three dimensional arrangement with at least some of said fibers extending transversely throughout the depth of the batt, defining a labrinth of intercommunicating voids, and a dry heat foamable resin composition adhered to and surrounding the fibers of said batt matrix, in quantities insufficient upon foaming to fill said voids and to destroy their intercommunication.

References Cited in the file of this patent

UNITED STATES PATENTS

| | | |
|---|---|---|
| 1,922,444 | Libbey | Aug. 15, 1933 |
| 1,973,904 | Knowland | Sept. 18, 1934 |
| 2,140,062 | Talalay | Dec. 13, 1938 |
| 2,187,140 | Faris et al. | Jan. 16, 1940 |
| 2,194,036 | Talalay | Mar. 19, 1940 |
| 2,256,034 | Nottebohm | Sept. 16, 1941 |
| 2,265,823 | Talalay | Dec. 9, 1941 |
| 2,293,927 | Beal | Aug. 25, 1942 |
| 2,293,928 | Beal | Aug. 25, 1942 |
| 2,339,142 | Bodle et al. | Jan. 11, 1944 |
| 2,461,942 | Ten Broeck | Feb. 15, 1949 |
| 2,580,202 | Talalay et al. | Dec. 25, 1951 |
| 2,673,824 | Biefeld et al. | Mar. 30, 1954 |
| 2,719,795 | Nottebohm | Oct. 4, 1955 |
| 2,719,802 | Nottebohm | Oct. 4, 1955 |
| 2,719,803 | Nottebohm | Oct. 4, 1955 |
| 2,719,806 | Nottebohm | Oct. 4, 1955 |
| 2,879,197 | Muskat et al. | Mar. 24, 1959 |

UNITED STATES PATENT OFFICE
CERTIFICATION OF CORRECTION

Patent No. 2,972,554           February 21, 1961

Irving E. Muskat et al.

It is hereby certified that error appears in the above numbered patent requiring correction and that the said Letters Patent should read as corrected below.

Column 5, line 72, for ' "Vinylafoam" ' read -- "Vinyafoam" --; column 6, line 49, for "paid" read -- pad --; column 7, line 29, for "allkyl" read -- allyl --; column 10, line 2, for "labrinth" read -- labyrinth --.

Signed and sealed this 18th day of July 1961.

(SEAL)
Attest:

ERNEST W. SWIDER
Attesting Officer

DAVID L. LADD
Commissioner of Patents